US 9,218,788 B2

(12) United States Patent
Murakami et al.

(10) Patent No.: US 9,218,788 B2
(45) Date of Patent: Dec. 22, 2015

(54) INFORMATION-PROCESSING DEVICE AND PROGRAM FOR DISPLAYING A WINDOW GROUP INCLUDING A PLURALITY OF WINDOWS

(75) Inventors: Keiichi Murakami, Tokyo (JP); Dai Kamiya, Tokyo (JP); Yasushi Onda, Tokyo (JP); Izua Kano, Tokyo (JP); Kazuhiro Yamada, Tokyo (JP); Naoki Hashida, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 294 days.

(21) Appl. No.: 13/057,795

(22) PCT Filed: Sep. 8, 2009

(86) PCT No.: PCT/JP2009/065678
§ 371 (c)(1),
(2), (4) Date: Feb. 7, 2011

(87) PCT Pub. No.: WO2010/029920
PCT Pub. Date: Mar. 18, 2010

(65) Prior Publication Data
US 2011/0161873 A1 Jun. 30, 2011

(30) Foreign Application Priority Data
Sep. 9, 2008 (JP) ................................ 2008-231356

(51) Int. Cl.
*G06F 3/048* (2013.01)
*G09G 5/14* (2006.01)
(Continued)

(52) U.S. Cl.
CPC *G09G 5/14* (2013.01); *G06F 3/033* (2013.01); *G06F 3/0482* (2013.01);
(Continued)

(58) Field of Classification Search
CPC ............ G09G 5/34; G09G 2340/0407; G09G 2340/0464; G06G 2340/045; G06F 3/033; G06F 3/0482; G06F 9/4443
USPC .......................................................... 715/800
See application file for complete search history.

(56) References Cited

U.S. PATENT DOCUMENTS 5,742,285 A    4/1998  Ueda
2004/0174398 A1*  9/2004  Luke et al. .................... 345/856
(Continued)

FOREIGN PATENT DOCUMENTS

CN    1702607 A    11/2005
CN    1997957 A    7/2007
(Continued)

OTHER PUBLICATIONS

First Notification of Office Action issued in Chinese Patent Application No. 200980134605.7 issued on Aug. 27, 2012.
(Continued)

*Primary Examiner* — Alvin Tan
*Assistant Examiner* — Rinna Yi
(74) *Attorney, Agent, or Firm* — MKG, LLC

(57) ABSTRACT

An information-processing device, if an instruction to display a window group is received, displays the window group in a first size in a display area of display means, and then displays at least a part of the window group in a second size that is greater than the first size in the display area. If operation means receives an instruction to specify a window that is displayed in the display area, the information-processing device executes a process based on the specified window.

8 Claims, 3 Drawing Sheets

(51) Int. Cl.
  *G06F 3/033*       (2013.01)
  *G06F 3/0482*      (2013.01)
  *G06F 9/44*        (2006.01)
  *G09G 5/34*        (2006.01)

(52) U.S. Cl.
  CPC .............. *G06F 9/4443* (2013.01); *G09G 5/34* (2013.01); *G09G 2340/045* (2013.01); *G09G 2340/0407* (2013.01); *G09G 2340/0464* (2013.01)

(56) References Cited

U.S. PATENT DOCUMENTS

| | | | |
|---|---|---|---|
| 2004/0261037 A1* | 12/2004 | Ording et al. | 715/788 |
| 2005/0005241 A1* | 1/2005 | Hunleth et al. | 715/720 |
| 2005/0120306 A1* | 6/2005 | Klassen et al. | 715/765 |
| 2005/0210399 A1* | 9/2005 | Filner et al. | 715/767 |
| 2006/0015818 A1 | 1/2006 | Chaudhri et al. | |
| 2006/0277469 A1 | 12/2006 | Chaudhri et al. | |
| 2007/0022389 A1 | 1/2007 | Ording et al. | |
| 2007/0182999 A1* | 8/2007 | Anthony et al. | 358/452 |
| 2007/0260999 A1* | 11/2007 | Amadio et al. | 715/804 |
| 2008/0012880 A1* | 1/2008 | Plut | 345/660 |
| 2008/0059893 A1 | 3/2008 | Byrne et al. | |
| 2008/0168361 A1* | 7/2008 | Forstall et al. | 715/753 |
| 2008/0174561 A1 | 7/2008 | Kim | |
| 2008/0282196 A1* | 11/2008 | Park | 715/838 |

FOREIGN PATENT DOCUMENTS

| | | |
|---|---|---|
| CN | 101226539 A | 7/2008 |
| EP | 1457868 A2 | 9/2004 |
| JP | 2000-122786 | 4/2000 |
| JP | 2003-280630 | 10/2003 |
| JP | 2006-085724 | 3/2006 |
| JP | 2007-122633 | 5/2007 |

OTHER PUBLICATIONS

Notification of Reasons for Rejection issued in Japanese Patent Application No. 2008-231356 issued on Sep. 4, 2012.
Supplemental European Search Report for EP app 09813066.9-1228/2325742 dated Dec. 5, 2011.
Office Action for EP app 09813066.9-1228 dated Jan. 27, 2012.
Communication pursuant to Article 94(3) EPC for European Patent Application No. 09813066.9-1903, dated Aug. 12, 2014.
Notification of Office Action issued in European Patent Application No. 2009813066.9-1903 issued on Jul. 23, 2015, 6 pages.

* cited by examiner

INFORMATION-PROCESSING DEVICE AND PROGRAM FOR DISPLAYING A WINDOW GROUP INCLUDING A PLURALITY OF WINDOWS

TECHNICAL FIELD

The present invention relates to a GUI (Graphical User Interface).

BACKGROUND

A window system called a multi-window system, in which plural windows can be displayed, is known. In a case where the multi-window system is used in an electronic device having a small display screen, such as a mobile phone, difficulty of an operation to select a desired window increases as a greater number of windows is displayed. For example, if a great number of windows is displayed on a screen at once, the size of each window has to be smaller, which makes it difficult to recognize a content of each window. Conversely, if each window is displayed in an appropriate size so that a user is able to recognize a content of each window, only some of the windows are displayed.

As a technique for improving operability in the multi-window system, techniques described in patent documents 1 and 2 are known. The techniques described in patent documents 1 and 2 are techniques by which a list display window is displayed in a display area and the list display window displays a list showing an arrangement of all windows, including any hidden windows.

Patent Document 1: JP-A-2003-280630
Patent Document 2: JP-A-2007-122633

However, if the above list display window is displayed in an electronic device having a small display screen, the list display window is overlapped on a currently displayed window. This reduces visibility of a content of the currently displayed window. Further, to avoid hiding the currently displayed window as much as possible, the size of the list display window has to be smaller. In this case, it becomes difficult to recognize a content of each window that is displayed in the list display window, which makes it difficult to recognize an arrangement of the windows.

An object of the present invention is to display a window group, in a case where plural windows can be displayed and a display area is small, so that a user is able to recognize an arrangement of windows included in the window group, and is able to recognize easily a content of at least a part of the window group.

SUMMARY

An information-processing device according to the present invention includes: display control means for controlling display means to display, if an instruction to display a window group is received, the window group in a first size in a display area of the display means, and then to display at least a part of the window group in a second size that is greater than the first size in the display area; and processing means for executing, if operation means receives an instruction to specify a window that is displayed in the display area, a predetermined process that is to be executed when the window is specified.

In the information-processing device according to the present invention, if the window group in the second size can be displayed within the display area, the display control means controls the display means to display the window group in the second size in the display area, without displaying the window group in the first size.

In the information-processing device according to the present invention, the information-processing device includes selecting means for selecting a window from the window group, wherein the display control means controls the display means to display the window group in the second size at such a position that whole of the window selected by the selecting means is displayed in the display area.

In the information-processing device according to the present invention, the display control means changes a size of the window group from the first size to the second size by zooming in to the window group.

In the information-processing device according to the present invention, the display control means controls the display means to display the window group so that the window group in the first size can be displayed within the display area.

A program according to the present invention is for causing a computer to execute steps of: controlling display means to display, if an instruction to display a window group is received, the window group in a first size in a display area of the display means, and then to display at least a part of the window group in a second size that is greater than the first size in the display area; and executing, if operation means receives an instruction to specify a window that is displayed in the display area, a predetermined process that is to be executed when the window is specified. The program according to the present invention may be downloaded to a computer via a network such as the Internet, and installed therein so that the program can be used. The present invention may be defined as a recording medium, such as an optical disk, that stores the program.

According to an aspect of the present invention, in a case where plural windows can be displayed and a display area is small, it is possible to display a window group so that a user can recognize an arrangement of windows included in the window group, and can recognize easily a content of at least a part of the window group.

DETAILED DESCRIPTION

Figure 1:
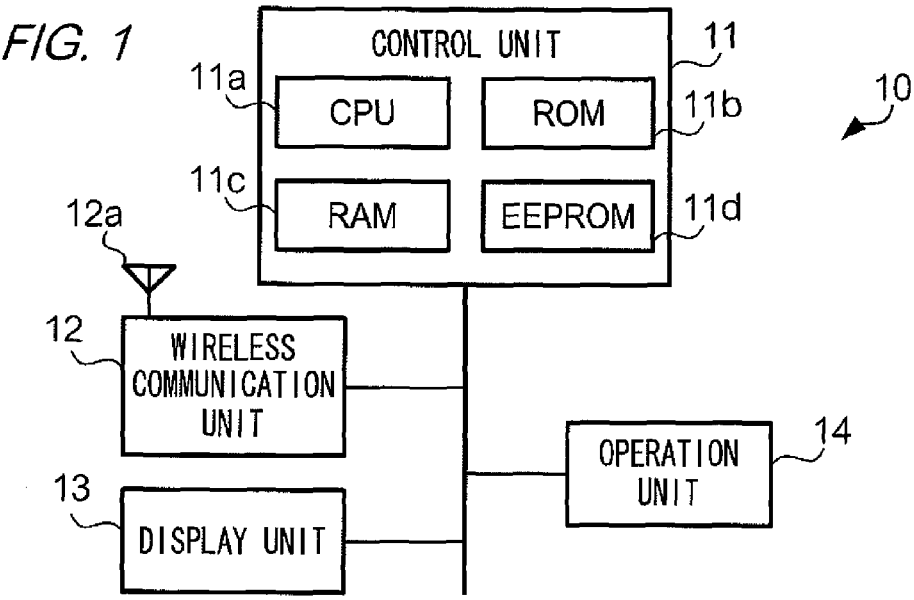
FIG. 1 is a block diagram showing a physical configuration of a communication terminal device.

FIG. 1 is a block diagram showing a physical configuration of a communication terminal device according to an embodiment of the present invention. It is to be noted that communication terminal device 10 according to the present embodiment is a mobile phone having a means for inputting and outputting a voice (not shown) such as a microphone and a speaker. In the present embodiment, display unit 13 is used as display means, operation unit 14 is used as operation means, and control unit 11 is used as display control means, processing means, and selecting means.

Control unit 11 includes CPU (Central Processing Unit) 11a, ROM (Read Only Memory) 11b, RAM (Random Access Memory) 11c, and EEPROM (Electronically Erasable and Programmable ROM) 11d, and CPU 11a executes a program stored in ROM 11b or EEPROM 11d while using RAM 11c as a work area, thereby controlling an operation of each unit of communication terminal device 10. Wireless communication unit 12 includes antenna 12a, and performs wireless data communication with a predetermined mobile communication network. Display unit 13 includes a liquid crystal display and a liquid crystal driving circuit, and displays an image in a predetermined display area based on display data provided from control unit 11. Operation unit 14 includes plural keys, and provides operation information to control unit 11, which corresponds to a press operation by a user. Operation unit 14 includes plural keys, and provides operation information corresponding to a press operation by a user. Operation unit 14 includes a widget key for inputting an instruction to display a widget list, a cursor key for selecting a window, a submit key for inputting an instruction to execute processing corresponding to a selected window, and a clear key for inputting an instruction to end processing. By operating the keys, a user is able to input desired instructions. It is to be noted that the cursor key is a key whereby one of four directions of left, right, up, and down is selected in the present embodiment; however, the cursor key may be a key whereby a direction other than the four directions, such as an oblique direction (right up, left down) may be selected. Also, it is to be noted that in the present embodiment a case in which the cursor key receives an instruction to select a desired direction is described; however, if communication terminal device 10 has a touch panel, the touch panel may receive such an instruction.

ROM 11b pre-stores some programs. Hereinafter, the programs will be referred to as "preinstalled programs." The preinstalled programs include a multitask operating system (hereinafter referred to as "multitask OS"), a Java™ platform, and native application programs (hereinafter referred to as "native applications"). The multitask OS is an operating system that supports functions to realize pseudo-parallel execution of plural tasks, such as assignment of a virtual memory space. The Java platform is a set of programs that are described in accordance with a CDC (Connected Device Configuration), which is a configuration for realizing Java Runtime Environment 130 (described later) in communication terminal device 10 in which the multitask OS is installed. The native applications are programs for realizing a basic function of communication terminal device 10 such as a telephone call.

EEPROM 11d includes Java application storage areas for storing Java application programs (hereinafter referred to as "Java applications"). A Java application includes a JAR (Java Archive) file that is a combination of a substance program that describes a procedure in a Java Runtime Environment, and image files or audio files that are used when the substance program is executed; and an ADF (Application Descriptor File) in which properties of installation and start-up of the JAR file are described. The Java application is prepared by a content provider or a carrier, and stored in an external server device, and can be downloaded from the server device on request by communication terminal device 10.

Figure 2:
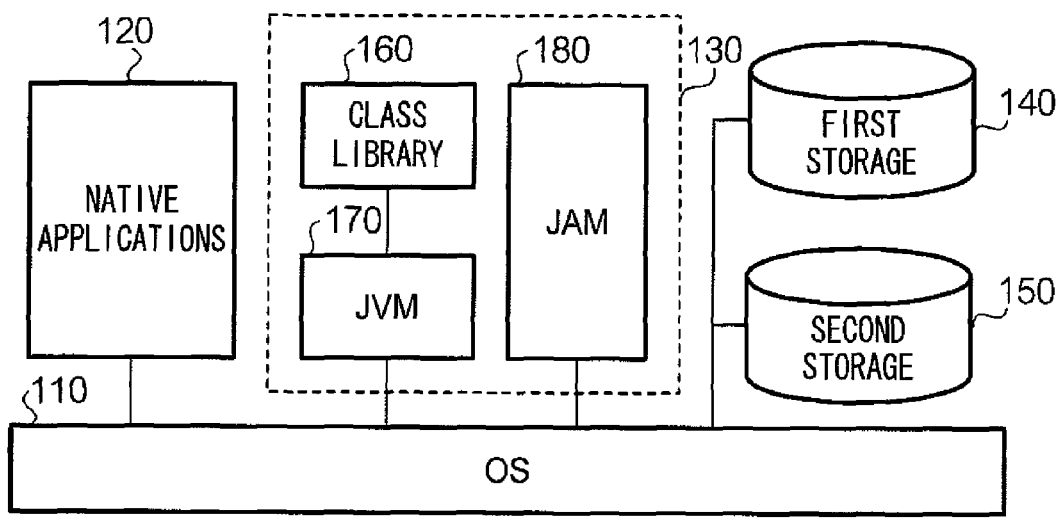
FIG. 2 is a diagram showing a logical configuration of a communication terminal device.

FIG. 2 is a diagram showing a logical configuration of units that are realized by control unit 11 of communication terminal device 10 by executing programs stored in ROM 11b and EEPROM 11d. As shown in the drawing, in communication terminal device 10 that executes the programs, native applications 120 and Java Runtime Environment 130 are realized in OS 110, and first storage 140 and second storage 150 are secured in EEPROM 11d.

Java Runtime Environment 130 is realized by use of the Java platform stored in ROM 11b. Java Runtime Environment 130 includes class library 160, JVM (Java Virtual Machine) 170, and JAM (Java Application Manager) 180. Class library 160 is a file of a combination of program modules (classes) that have a particular function. JVM 170 is a Java Runtime Environment that is optimized for the CDC described above, and has a function of interpreting and executing bite codes provided as a Java application. JAM 180 has a function of managing downloading, installation, start-up, and end of Java applications.

First storage 140 is an area for storing Java applications (a JAR file and an ADF), which are downloaded under control of JAM 180. Second storage 150 is an area in which an individual storage area is assigned to each installed Java application, and is used for storing data generated during running of Java applications after the applications end. Data assigned to a certain Java application in a storage area can be rewritten only when the Java application is running; therefore, the data cannot be rewritten by another Java application.

Java applications of the present embodiment include applications for displaying plural windows. The Java applications for displaying plural windows include a "list display application" and a "widget." The list display application is an application program for displaying one or more windows in a display area of display unit 13, and controlling the display appearance. The "widget" is an application program that realizes a predetermined function. The widget includes a main program and a list display program. The main program is started when an instruction to execute a widget has been received, and provides a function of the widget. The list display program is started by the list display application, and provides a part of the function of the widget.

In the present embodiment, plural widgets appear, each widget realizing a different function. The widgets include, for example, a widget for displaying a time and date by displaying a clock image in a window (hereinafter referred to as "clock widget"), a widget for displaying characters input by a user in a window as a memorandum (hereinafter referred to as "memo widget"), or a widget for playing a video or music (hereinafter referred to as "play widget"). Also, the widgets may include a widget that acquires information such as news or weather forecast via wireless communication unit 12 at a predetermined time, and displays the acquired information.

Each widget is able to execute different processing depending on whether the list display program is started or the main program is started. For example, the clock widget executes processing to display a date and time when the list display program is started; while the clock widget executes processing to change a date and time, or an appearance (such as color) when the main program is started. The memo widget executes processing to display characters when the list display program is started; while the memo widget executes processing to change characters when the main program is started. Similarly, the play widget executes processing to play a video or music when the list display program is started; while the play widget executes processing to adjust a volume, pause, fast-forward when the main program is started. The processing is carried out depending on an operation performed by a user. For example, when a user performs an operation to set a clock, the time is changed accordingly.

A "window" of the present embodiment refers to a part of a display area of display unit 13 that is assigned to a widget, which is displayed as an image that can be distinguished from an image in another part of the display area. In other words, control unit 11 displays windows (images) that represent processing of widgets by executing the widgets stored in ROM 11*d*. A shape or a size (area) of a window is predetermined for each widget; however, it may be changed.

The foregoing is a description of the configuration of communication terminal device 10 according to the present embodiment. With the configuration, communication terminal device 10, when a list display application is running, starts a list display program of each of plural widgets, and displays plural windows, whereby a multi-window system is realized. A user is able to select one from among plural windows or change a window that has been selected by operating the cursor key of operation unit 14. Control unit 11 selects at least one from among plural windows displayed on display unit 13, or changes a window that has been selected, in accordance with operation information provided from operation unit 14. Control unit 11 may select a single window or plural windows. In the following description, a window that has been selected will be referred to as "selected window," and a window that has not been selected will be referred to as "non-selected window." It is to be noted that in the present embodiment the "selection of a window" means specifying a window of focus.

When a list display application is running, a user can specify a window displayed on display unit 13 by operating the submit key of operation unit 14. When operation unit 14 receives an instruction to specify a window displayed on display unit 13, control unit 11 executes processing corresponding to the specified window. It is to be noted that in the present embodiment "specification of a window" means selecting a window and inputting an instruction to execute processing of a widget corresponding to the window. For example, when a window corresponding to the clock widget is selected, a main program of the clock widget is started, whereby processing for changing an appearance (such as color) can be executed. A window that is displayed by execution of the main program has a display size greater than that of a window that is displayed by execution of the list display program; thus, when the main program is executed, it appears to a user that a display size of the window of the clock widget increases.

The window display application can suspend displaying a widgets list. For example, in a case where a user starts a telephone call while the list display application is displaying a widget list, communication terminal device 10 carries out an interrupt processing to suspend displaying a widget list, and change the image displayed on display unit 13 to an image for a telephone call. To do so, when displaying a list of widget, control unit 11 of communication terminal device 10 generates display information indicating how plural windows are displayed, and stores the information in EEPROM 11*d*. Control unit 11 updates the display information each time the display of windows changes. The display information includes information indicating windows displayed at the time, information indicating the arrangement of the windows, and information indicating windows selected at the time. The display information also includes identification information identifying each window. After the telephone call ends, and the user performs a predetermined operation, the list display application resumes the display of the widget list. Communication terminal device 10 resumes the display of the widget list in a display appearance similar to a display appearance in which the display of the list was performed before the display was suspended, by referring to display information.

Figure 3:
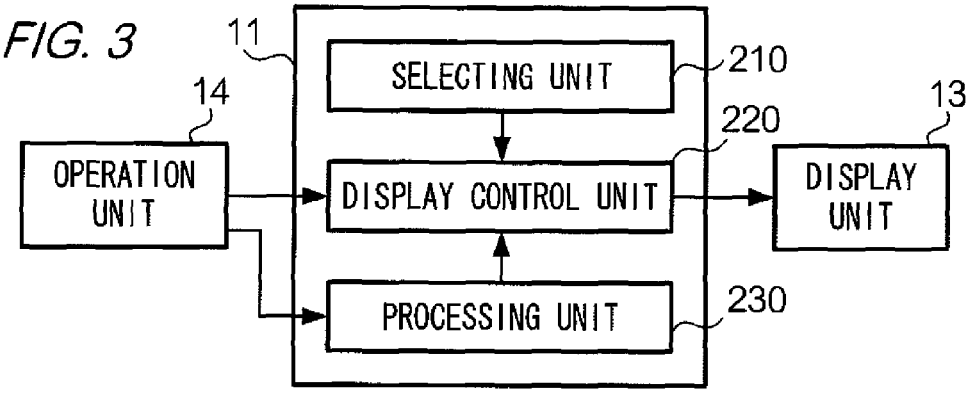
FIG. 3 is a functional block diagram showing functions realized by a communication terminal device.

FIG. 3 is a functional block diagram showing functions realized by control unit 11 of communication terminal device 10 when control unit 11 displays a widget list (namely, control unit 11 executes a list display application). As shown in the drawing, control unit 11 of communication terminal device 10 realizes functions corresponding to selecting unit 210, display control unit 220, and processing unit 230 by executing a stored program.

Selecting unit 210 has a function of selecting a window from among plural windows. Selecting unit 210, when selecting a selected window, may determine a selected window on the basis of display information or history information stored in EEPROM 11*d*, or determine a selected window in accordance with an instruction input by a user. For example, when operation unit 14 receives an instruction to change a selected window, selecting unit 210 changes a selected window in accordance with the instruction. Selecting unit 210 identifies an instructed direction, and specifies a non-selected window that is located in the direction from the selected window and that is closest to the selected window, as a selected window.

Display control unit 220 has a function of controlling a content displayed on display unit 13. For example, display control unit 220 starts or ends display of plural windows, or changes a display position or appearance of each window. Display control unit 220 also controls display of a selected window and a non-selected window so that they can be distinguished from each other. Specifically, display control unit 220 controls display of a selected window and a non-selected window such that they have different appearances.

Processing unit 230 has a function of executing processing corresponding to a window specified by a user operation. For example, if operation unit 14 receives an instruction to specify a window displayed, processing unit 230 executes processing corresponding to the specified window. Display control unit 220 controls display unit 13 to display a result of processing executed by processing unit 230 on the display unit 13.

Figure 4:
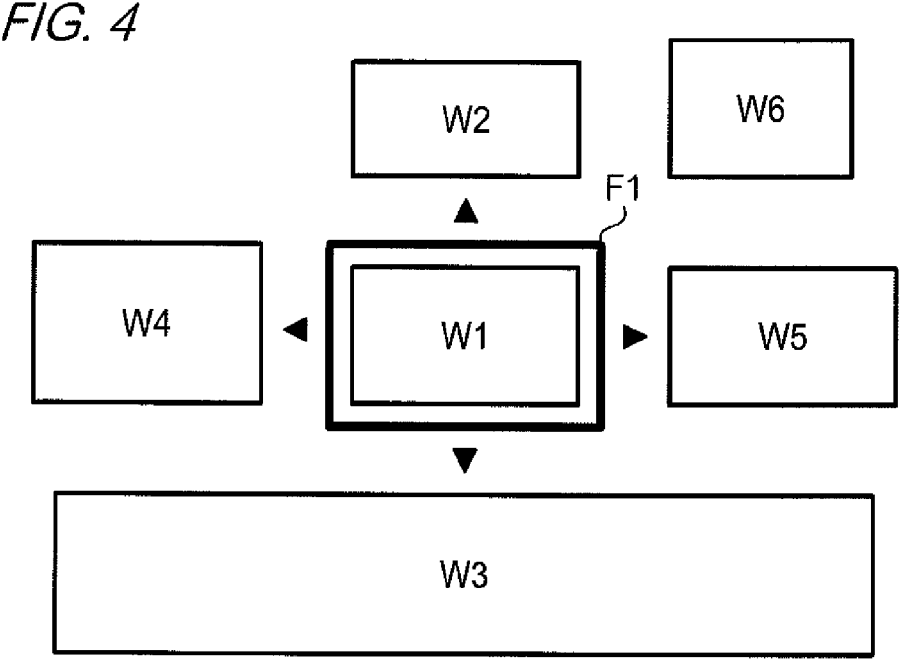
FIG. 4 is a diagram showing an example of a display appearance of both a selected window and non-selected windows.

FIG. 4 is a diagram showing an example of a display appearance of both a selected window and non-selected windows, display of which is controlled by display control unit 220. As shown in the drawing, display control unit 220, in a case where a selected window is window W1, differentiates window W1 from windows W2 to W6, which are non-selected windows, by adding frame F1 to window W1. It is to be noted that a method of differentiating a selected window from a non-selected window is not limited to this example, and a method of blinking a selected window or a method of making a non-selected window appear to be translucent may be employed.

A transition of a selected window is performed on the basis of an operation direction indicated by an operation of the cursor key. For example, in a case where a selected window is window W1, display control unit 220 recognizes that windows W2 to W5, which are located to left, right, up, or down directions relative to window W1, are windows that can be subsequently selected. In this case, if a user selects window W6, a selected window is changed from window W1 to window W2 (or W5), and further changed to window W6. Namely, two transitions have to be performed.

Display control unit 220 may perform a control to display a predetermined character or image as a mark between a selected window and a window that can be selected subsequently. Such a display makes it easier for a user to recognize a window that can be selected subsequently. It is to be noted that in a case where there are plural windows that can be selected subsequently in one direction as in a case shown in FIG. 4 in which window W3 is a selected window (in this case, plural windows exist in an upper direction), one window is recognized as a window that can be selected subsequently in accordance with a predetermined rule, and a mark is displayed in connection with the window.

Figure 5:
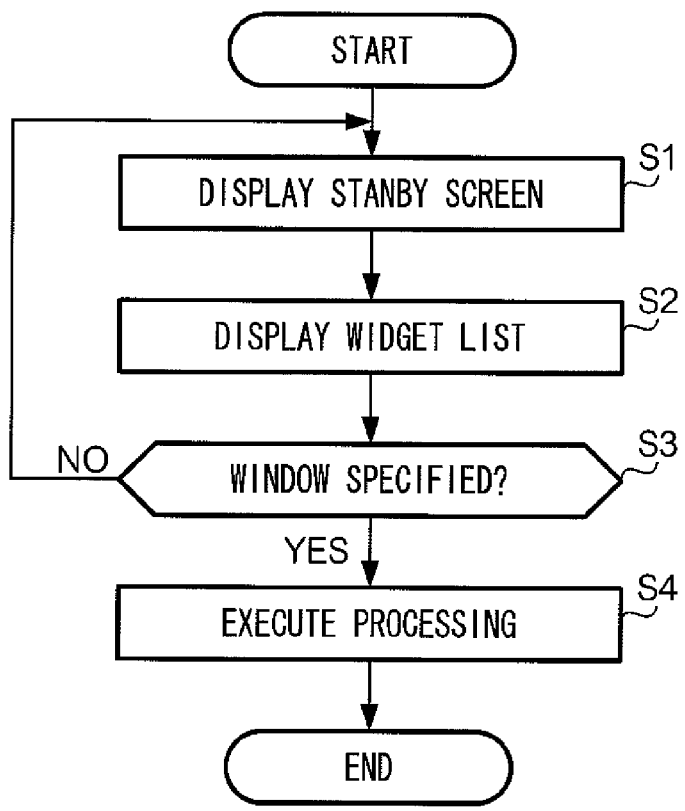
FIG. 5 is a flowchart showing a control, which is carried out in a communication terminal device, to display a widget list.

FIG. 5 is a flowchart showing a control to display a widget list, which is carried out by control unit 11 having the above configuration and function. It is assumed here that a widget list is displayed, and then a user performs an operation to end displaying the widget list. In this case, a list display program of each widget, which has been executed when the widget list has been displayed, remains in the running state after display of the widget list ends. The running state refers to a state in which the list display program is read out and stored in RAM 11c. If a user operates the clear key of operation unit 14 to end displaying a widget list, control unit 11 displays a standby screen on display unit 13 (step S1). The standby screen refers to a screen displayed when communication terminal device 10 stands by for various processing such as a telephone call. It is assumed here that a user operates the widget key of operation unit 14 to display a widget list again. By this operation, control unit 11 displays a widget list in accordance with a list display program of each running widget (step S2).

Specifically, control unit 11 firstly determines an arrangement of windows corresponding to the running widgets in accordance with the predetermined algorithm. It is assumed here that a plurality of widgets are running. In this case, an arrangement of windows W1 to W8 corresponding to the widgets is determined. FIG. 6(a) is a diagram showing an example of a determined arrangement of windows W1 to W8. The arrangement may be the same as that of a widget list displayed most recently, or alternatively may be a new arrangement determined using a random function. If the arrangement is the same as that of a widget list displayed most recently, EEPROM 11d may store information on the previous arrangement and selected window. Alternatively, control unit 11 may arrange windows in an order in which widgets were downloaded. Alternatively, control unit 11 may arrange windows based on the number of executions of widgets. In essence, control unit 11 may make the determination in accordance with a predetermined algorithm.

After the arrangement of windows is determined, control unit 11 generates complete image G in which windows W1 to W8 are arranged in the determined arrangement, and controls display unit 13 to display the complete image G in a size (first size) corresponding to the first scale (small scale) in the display area R of display unit 13. It is assumed here that a size of complete image G when complete image G is displayed in a size corresponding to the second scale, which is described later, is greater than display area R. FIG. 6(b) is a diagram showing an example of entire screen p displayed in display area R of display unit 13. As shown in the drawing, on entire screen p, complete image G is displayed in a reduced size so that entire complete image G can be displayed. In other words, complete image G is displayed on entire screen p in such a size that entire complete image G can be displayed within display area R. A user is able to recognize an arrangement of windows W1 to W8 by the image displayed on entire screen p.

After entire screen p is displayed in this manner, control unit 11 controls display unit 13 to display complete image G in a size (second size) corresponding to the second scale (large scale) that is greater than the first scale in display area R of display unit 13 by zooming in to the selected window. Control unit 11 controls display of at least a part of complete image G such that the selected window is displayed in display area R. The selected window may be a window that has been selected in a widget list displayed most recently, or alternatively may be a window that is newly selected in accordance with an operation of operation unit 14 by a user. In other words, if control unit 11 selects a window from among plural windows, and receives an instruction to display a window group that includes plural windows, control unit 11 controls display unit 13 to display the window group in the first size in display area R of display unit 13, and then to display at least a part of the window group at the second size that is greater than the first size in display area R of display unit 13 such that the whole of the selected window is displayed in display area R. Control unit 11 changes a size of the window group from the first size to the second size by zooming in to the window group.

FIG. 6(c) is a diagram showing an example of magnified screen q displayed in display area R of display unit 13. In the drawing, window W1 is a selected window. On magnified screen q, window W1, which is the selected window, and window W2 that is located in the area around window W1 are displayed in a size corresponding to the second scale. Although it is not shown in the drawing, a title of window W1, which is the selected window, is displayed at a position corresponding to window W1. A user is able to recognize both a content of window W1, which is the selected window, and contents of windows, which are located in the area around window W1, by the image displayed on magnified screen q. In the magnified screen q, windows W3 and W4 are not shown; however, on viewing entire screen p shown in FIG. 6(b), which is displayed prior to magnified screen q, the user would also note positions of these windows. Therefore, the user is able easily to perform an operation to select not only windows W1, W2, and W5 to W8 displayed on magnified screen q, but also windows W3 and W4 by scrolling a screen or the like.

In FIG. 6(c), window W1 is the selected window. However if window W6 is the selected window, magnified screen q' is displayed as shown in FIG. 6(d). On magnified screen q', window W6, which is the selected window, and windows that are located in the area around window W6, are displayed in a size corresponding to the second scale. On magnified screen q', windows W1, W7, and W8 that are located at a left end of display area R, and windows W3 and W4 that are located at a right end of display area R, are partially displayed.

When magnified screen q is displayed, control unit 11 acquires a pictogram that represents an attribute of a widget corresponding to each window displayed in display area R, and displays the acquired pictogram at a position corresponding to the window. The pictogram is attribute information on an attribute of a widget, and is stored in EEPROM 11d or the like in advance. The attribute of widget may be a type of widget, an execution status, a communication connection status, or a type of a communication. On magnified screen q shown in FIG. 6(c), pictogram I1 "New" is displayed near window W1. This pictogram I1 represents that a widget corresponding to window W1 is a recently downloaded application program. Near window W5, pictogram I2 representing a state in which a communication is being carried is displayed. Pictogram I2 represents that a widget corresponding to window W5 is carrying out a communication by execution of a list display program. Near window W8, pictogram I3 representing a status in which an SSL (Secure Socket Layer) communication, which has high reliability, is being carried out is displayed. This pictogram I3 represents that a widget corresponding to window W8 is carrying out the SSL communication by execution of a list display program. By viewing these pictograms, a user is able to recognize details or a status of a widget, and also to recognize a status in which a communication is running by execution of the list display program, and a type of the communication.

Subsequently, control unit 11 determines whether an operation to specify a window from among windows displayed in display area R has been performed (step S3). For example, if a user operates the clear key of operation unit 14, or alternatively, no operation is performed during a predetermined time, control unit 11 determines that the operation to specify a window has not been performed (step S3: NO). In this case, control unit 11 returns step S1 described above, and controls display unit 13 to display a standby display on display unit 13. Meanwhile, if a user operates the cursor key of operation unit 14 to select a desired window, and then operates the submit key, control unit 11 determines that a window is specified (step S3: YES). It is to be noted that a user can select and specify either window W3 or W4, which is not displayed on magnified screen q shown in FIG. 6(*c*), by operating the cursor key as described above, namely repeating an operation to move a selected window from window W1 to the rightward window shown in the drawing. When a window is specified, control unit 11 executes a main program of a widget corresponding to the specified window, to execute processing in accordance with the widget (step S4). In other words, if operation unit 14 receives an instruction to specify a window displayed in display area R of display unit 13, control unit 11 executes processing corresponding to the specified window. For example, in a case where window W1 is specified on magnified screen q shown in FIG. 6(*c*), a main program of a widget 14 corresponding to window W1 is executed, and processing of the widget is executed.

In the present embodiment described above, when a widget list is displayed, it follows a procedure in which firstly, an entire screen that represents each of windows corresponding to running widgets, then a magnified screen that is the magnified entire screen is displayed. By displaying the magnified screen, each window is easily visible even in a small display area included in a mobile phone. In addition, as described above, although some windows are not displayed on the magnified screen, by displaying the entire screen, it is possible to make a user to aware of existence of these windows not shown, and positions of the windows. In other words, in a case where plural windows can be displayed and a display area is small, it is possible to display a window group, so that a user is able to recognize an arrangement of each window included in a window group, and it is possible to make it easier to recognize a content of at least a part of the window group. Further, in the embodiment described above, the magnified screen is displayed after the entire screen is zoomed in on. This gives an appearance to a user that the entire screen moves toward the user. According to the present embodiment, it is possible to realize such an interesting display.

The present invention may be implemented in an embodiment that is different from the above embodiment. For example, the present invention may be implemented in the embodiments described below. It is to be noted that the following modifications may be combined with each other.

In the above embodiment, if complete image G is displayed in a size corresponding to the second scale, and all windows included in complete image G can be displayed within display area R, such as a case where complete image G includes a single window, magnified screen q may be displayed straight, without displaying of entire screen p. In other words, if a window group in a size corresponding to the second scale can be displayed within display area R, control unit 11 may control display unit 13 to display the window group in a size corresponding to the second scale in display area R of display unit 13, without displaying the window group in a size corresponding to the first scale. In this case, control unit 11 may determine whether complete image G in a size corresponding to the second scale can be displayed within display area R. If complete image G can be displayed within display area R, control unit 11 may cause complete image G to display in a size corresponding to the second scale, without displaying complete image G in a size corresponding to the first scale.

Control unit 11 may determine whether to display entire screen p based on the number of windows displayed. Specifically, control unit 11 may display entire screen p when the number of the windows is equal to or greater than a predetermined threshold value, and may not display entire screen p when the number is smaller than the predetermined threshold value.

Alternatively, control unit 11 may determine whether to display entire screen p by determining whether all windows whose arrangement has been changed can be displayed. Specifically, control unit 11 may compute an image in which windows are actually arranged, and if all windows cannot be displayed, the control unit may display entire screen p, and if all windows can be displayed, the control unit may not display entire screen p.

Alternatively, control unit 11 may determine whether to display entire screen p based on the sizes of the windows. For example, control unit 11 may calculate the total boundary length of the windows, and if the calculated length is equal to or greater than a threshold value, the control unit may display entire screen p, and if the calculated length is smaller than the threshold value, the control unit may not display entire screen p. Alternatively, control unit 11 may calculate the total area of the windows, and if the calculated area is equal to or greater than a threshold value, the control unit may display entire screen p, and if the calculated area is smaller than the threshold value, the control unit may not display entire screen p.

Alternatively, control unit 11 may determine whether to display entire screen p based on an operation carried out by a user. For example, control unit 11 may display entire screen p when a predetermined key of operation unit 14 is clicked once or pressed for an extended period, and may not display entire screen p when the predetermined key is clicked two times or is pressed for a short period.

In the above embodiment, the second scale, which is used when control unit 11 displays entire screen p, may be of a fixed value or a variable value. Specifically, control unit 11 may change a scale by use of which all windows are displayed in entire screen p, depending on the number or the arrangement of the windows. Alternatively, control unit 11 may always display a window group in entire screen p in a size corresponding to a fixed scale.

Figure 6:
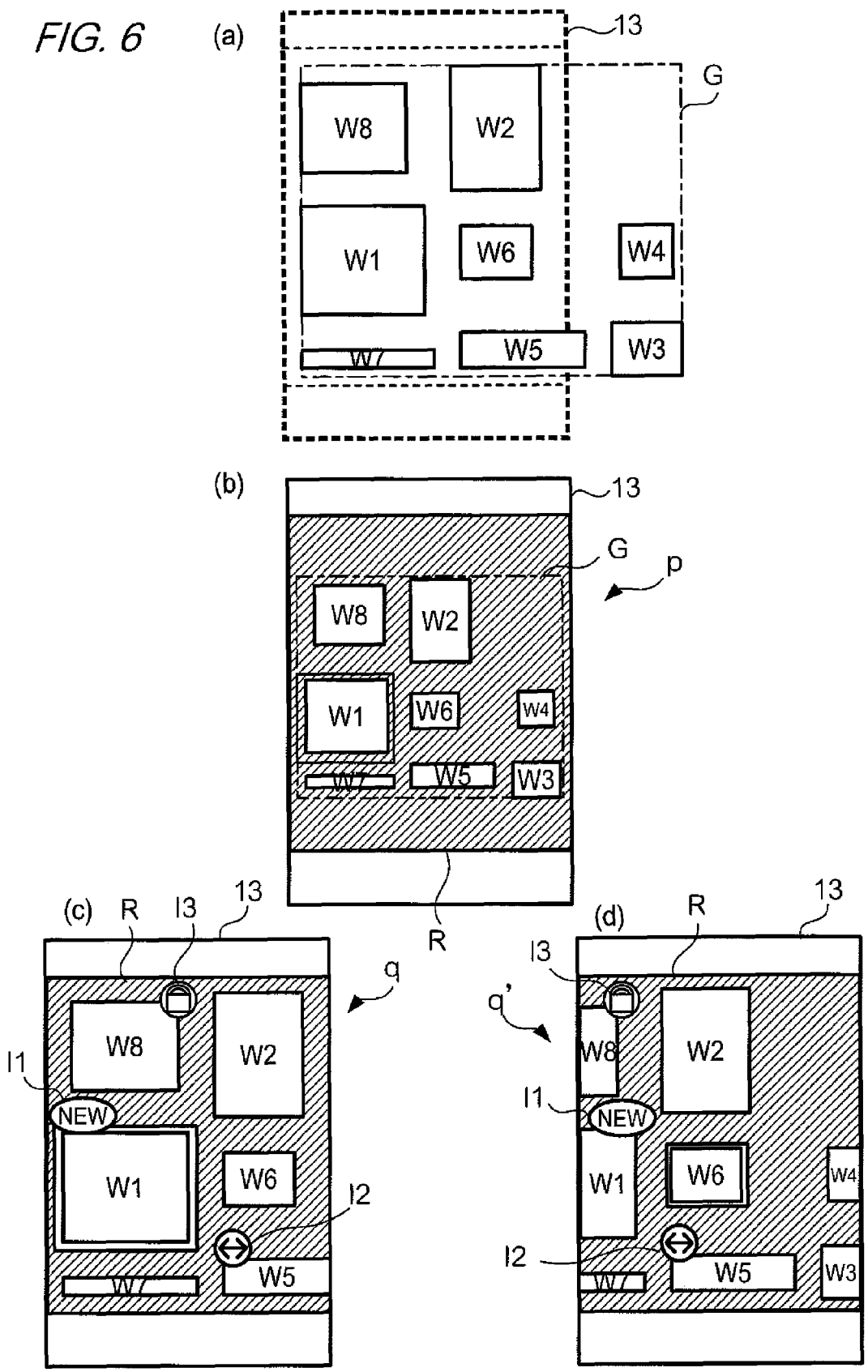
FIG. 6 is a diagram showing an example of a widget list screen displayed on a display unit.

In the example shown in FIG. 6(*b*) of the above embodiment, control unit 11 displays plural windows in such a scale size that all windows can be displayed within display area R of display unit 13. However, in the above embodiment, control unit 11 may display entire screen p in such a scale size that at least a part of each of the windows is displayed. The essential point is that control unit 11 displays a window group in a size corresponding to a scale that is smaller than the second scale when displaying entire screen p.

In the above embodiment, control unit 11 may change a time period for which entire screen p is displayed, depending on the displayed content. For example, control unit 11 may lengthen a time period in which entire screen p is displayed, in proportion to the number of windows displayed. Alternatively, control unit 11 may lengthen a display time of entire screen p in proportion to a difference between the first scale and the second scale. The essential point is that control unit 11 lengthens a display time of entire screen p in proportion to a degree of difficulty experienced by a user in recognizing the arrangement of all windows.

Alternatively, it may be possible to change a time period for which entire screen p is displayed, depending on an operation carried out by a user. For example, control unit 11 may display entire screen p while a user presses a predetermined key for an extended period. More specifically, control unit 11 may display entire screen p while a user presses the predetermined key for an extended period, and if the user releases the key, the control unit may change entire screen p to magnified screen q.

A speed at which entire screen p is changed back to magnified screen q may be changed. Alternatively, a time period taken for changing entire screen p back to a magnified screen may be changed. For example, control unit 11 may reduce the speed in proportion to the number of windows displayed. Alternatively, control unit 11 may reduce the speed in proportion to the total area of windows. Alternatively, control unit 11 may reduce the speed in proportion to a difference between the first scale and the second scale. In essence, control unit 11 may reduce the speed so that a time period in which entire screen p is displayed is lengthened in proportion to a degree of difficulty experienced by a user in recognizing the arrangement of all windows.

Alternatively, control unit 11 may change a speed at which entire screen p is changed back to magnified screen q (or a time period taken for changing entire screen p back to a magnified screen) in accordance with an operation carried out by a user. Specifically, control unit 11 may reduce the speed when the predetermined key has been pressed for an extended period.

In the above embodiment, a case where a widget acquires information via a means other than wireless communication unit 12 is described; however, the widget may acquire information via means other than wireless communication unit 12. For example, if an information-processing device according to the present invention has a so-called IC tag, a widget may acquire information via the IC tag. In this case, if a prepaid card service is available, it is possible to acquire and display information on a balance. Alternatively, if an information-processing device according to the present invention has a GPS (Global Positioning System) positioning function, a widget may acquire location information (a latitude and longitude or a distance from a given point) using the positioning function.

In the above embodiment, a case is described in which pictograms I1 to I3 shown in FIG. 6(*c*) are displayed on magnified screen q; however, a pictogram displayed on magnified screen q is not limited to these pictograms. On magnified screen q, a pictogram such as a pictogram representing a high reliable widget, a pictogram representing use of a positioning function such as GPS, and a pictogram representing a widget that uses electronic money, may be displayed. Also, on magnified screen q, a pictogram such as a pictogram representing a widget that requires a charge to be made for each use, and a pictogram representing an amount to be charged, may be displayed. In essence, a pictogram representing valuable information for a selection of a widget by a user, or information to inform a user of a potential disadvantage (for example, communication fee arising) may be displayed.

In the above embodiment, complete image G is displayed on magnified screen q such that a window selected in a widget list displayed most recently, or a window newly selected in accordance with an operation of operation unit 14 by a user is displayed in display area R. However control unit 11 may calculate the number of start-ups of each widget, and may display a complete image G so that a window of a widget that has a greatest number of start-ups of running widgets may be displayed in display area R. Alternatively, control unit 11 may display complete image G so that a window of a most recently downloaded widget of running widgets is displayed in display area R. If communication terminal device 10 includes a touch panel, control unit 11 may display complete image G so that a window selected by a touch operation on the touch panel by a user may be displayed in display area R.

The above embodiment is an embodiment in which overlapping of windows is avoided. However, the present invention may be implemented in an embodiment in which windows overlap each other. Namely, the present invention can be implemented in a system of overlapping windows. Also, the present invention can be applied to a so-called tiling window system in which plural windows are displayed side-by-side. When the present invention is applied to a tiling window system, adjacent windows may be arranged with no space between them.

In the present invention, an arrangement of images, such as icons, may be changed instead of that of windows. In other words, the term "window" referred in the present invention has a concept including an image, such as an icon.

In the above embodiment, entire screen p is displayed after an arrangement of windows is determined. However entire screen p on which windows are randomly arranged is displayed, and then entire screen p may change to magnified screen q while the arrangement of windows is changed in a predetermined algorithm. In other words, control unit 11 may gradually change content displayed in display area R in animation, so that entire screen p changes to magnified screen q while an arrangement of windows changes. In this operation, control unit 11 changes positions of windows by reducing a scale from the first scale to the second scale gradually.

In the above embodiment, description is made of a case where the present invention is applied to display of a widget list. However, if communication terminal device 10 includes plural functions, such as a mailing function, and a web browser function, and is capable of displaying plural windows corresponding to the functions, the present invention may be applied to displaying of a list of windows corresponding to running functions In the above embodiment, description is made of a case where a widget list is displayed after a standby screen. However a widget list may be displayed after a screen that is displayed during telephone call, a schedule screen, an address book screen, or an application screen such as that of an email or a game. In this case as well, entire screen p is displayed once, and then magnified screen q is displayed.

In the above embodiment, magnified screen q is automatically displayed after entire screen p is displayed. However, if a user operates a predetermined key of operation unit 14 while entire screen p is displayed, magnified screen q that is magnified in the area around the selected window may be displayed.

In the above embodiment, a user inputs instructions by operating keys of operation unit 14. However, soft keys may be displayed on display unit 13, which correspond to keys of operation unit 14, and may be used to input instructions. Alternatively, if communication terminal device 10 has a touch panel, soft buttons on the touch panel may be used as operation keys.

When the above widget list is displayed, different processing may be executed depending on whether a window is selected or no window is selected, by a widget corresponding to the window. For example, processing in which an analog clock image is displayed to represent a time and date may be executed when the clock widget is not selected; while processing in which a digital clock image is displayed to represent a time and date may be executed when the clock widget is selected.

A window according to the present invention may be not only a display area assigned to a "widget" of the above embodiment, but also a display area assigned to another application such as a native application. Also, a widget may be not only a Java application, but also another application, such as a native application, or an application program for displaying a web browser. Also, in the above embodiment where display of plural windows is enabled by executing a list display application, which is a Java application, display of plural windows may be enabled by another application such as an OS.

In the above embodiment, control unit 11 may be deemed as corresponding to an information-processing device according to the present invention, or communication terminal device 10 may be deemed as corresponding to the information-processing device. An operation according to the present invention may be not only a pressing of a key, but also recognition of a voice instruction.

The above embodiment is an embodiment in which the present invention is applied to a mobile phone. However, the present invention may be applied to another electronic device. The present invention may be applied to a communication terminal device such as a PDA (Personal Digital Assistance), or an information-processing device such as a camera, a portable music player, or a portable game device.

The functions shown in FIG. 3, which are realized by communication terminal device 10, may be realized by a collection of programs or cooperation of plural hardware resources. For example, an operation corresponding to display control unit 220 and operations corresponding to selecting unit 210 and processing unit 230 may be carried out by different programs. Alternatively, the operations may be carried out by different hardware resources.

The invention claimed is:

1. An information-processing device comprising:
a control unit comprising a processing unit and memory, wherein the processing unit executes a program stored in the memory thereby controlling an operation of the information-processing device, the control unit configured to:
generate an image in which a size of the image is greater than a display area of a display unit, wherein a window group is the image having a plurality of windows arranged therein, each of the plurality of windows corresponding to a running program;
select a window from the plurality of windows displayed on the display unit in accordance with an instruction made by a user;
in response to an instruction by the user to display the window group, control the display unit to reduce and display the window group in a first size such that a whole of the image is displayed to fit within the display area of the display unit and the user is able to recognize an arrangement of the plurality of windows by the image displayed on the display area of the display unit, and then to display at least a part of the window group including the selected window in a second size that is greater than the first size in the display area of the display unit by zooming in to the selected window, so that whole of the selected window is displayed in the second size on the display area of the display unit; and
execute, if an operation unit receives an instruction from the user to specify a window after the selected window is displayed in the second size on the display area of the display unit, a process associated with the specified window.

2. The information-processing device according to claim 1, wherein if the window group in the second size can be displayed within the display area of the display unit, the window group is displayed in the second size in the display area of the display unit, without displaying the window group in the first size.

3. The information-processing device according to claim 1, wherein the window group is displayed so that the window group in the first size can be displayed within the display area of the display unit.

4. The information-processing device according to claim 1, wherein the window group is displayed in the first size in the display area of the display unit in response to the instruction received while a standby screen is displayed on the display unit.

5. The information-processing device according to claim 1, wherein the window group in the second size is displayed at such a position that the whole of the selected window and at least a part of a window located in an area around the selected window are displayed in the display area of the display unit.

6. The information-processing device according to claim 1, wherein the window group is displayed in the first size such that a whole of the window group is displayed within the display area of the display unit for a predetermined time period and then a part of the window group is then displayed sequentially.

7. The information-processing device according to claim 6, wherein the predetermined time period is changed based on a number of windows included in the window group or a difference between the first size and the second size.

8. A non-transitory computer readable medium storing a program that causes a computer to execute steps, the steps comprising:
generating an image in which a size of the image is greater than a display area of a display unit, wherein a window group is the image having a plurality of windows arranged therein, each of the plurality of windows corresponding to a running program;
selecting a window from the plurality of windows displayed on the display unit in accordance with an instruction made by a user;
in response to an instruction by the user to display the window group, controlling the display unit to reduce and display the window group in a first size such that a whole of the image is displayed to fit within the display area of the display unit and the user is able to recognize an arrangement of the plurality of windows by the image displayed on the display area of the display unit, and then to display at least a part of the window group including the selected window in a second size that is greater than the first size in the display area of the display unit by zooming in to the selected window so that whole of the selected window is displayed in the second size on the display area of the display unit; and
executing, if an operation unit receives an instruction from the user to specify a window after the selected window is displayed in the second size on the display area of the display unit, a process associated with the specified window.

* * * * *